H. BESSER.
CORN HUSKER.
APPLICATION FILED MAR. 10, 1911.

1,040,854.

Patented Oct. 8, 1912.

WITNESSES:
J. Ray Abbey
Christine A. Braidel

INVENTOR.
Herman Besser
BY
Geo. B. Willcox ATTORNEY.

UNITED STATES PATENT OFFICE.

HERMAN BESSER, OF ALPENA, MICHIGAN.

CORN-HUSKER.

1,040,854.  Specification of Letters Patent.  Patented Oct. 8, 1912.

Application filed March 10, 1911. Serial No. 613,597.

*To all whom it may concern:*

Be it known that I, HERMAN BESSER, a citizen of the United States, residing at Alpena, in the county of Alpena and State of Michigan, have invented certain new and useful Improvements in Corn-Huskers; and I do hereby declare the following to be a full, clear, and exact description of the invention, such as will enable others skilled in the art to which it appertains to make and use the same.

This invention is a corn husker and relates more particularly to hand implements for use in removing the husks from ears of corn.

The objects of the invention are to provide a hand implement by which the husks may be grasped and stripped from one side of the ear, the butt of the ear severed, and the husk from the opposite side of the ear stripped off, all without changing the position of the implement in the hand, the implement being so arranged as to accomplish these results with a very few movements of the hands, thereby lessening the labor and increasing speed.

Another object of this invention is to provide a husking implement with which the operator can work for a long period of time without causing soreness or injury to his hands.

Still another object is to provide a husker that is light, inexpensive, simple in construction and not liable to get out of order.

The device is illustrated in the accompanying drawings, in which—

Figure 1:
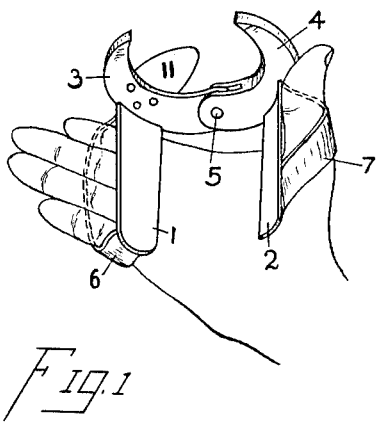
Figure 2:
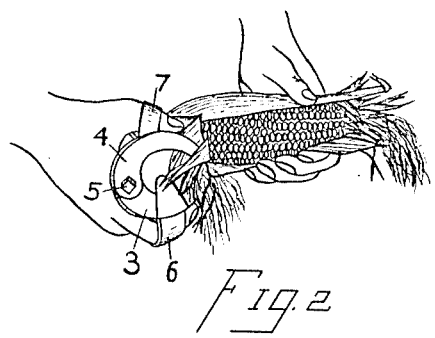
Figure 3:
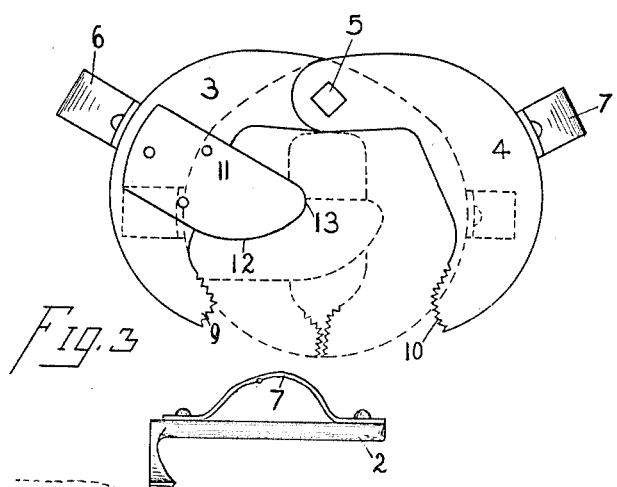
Figure 4:
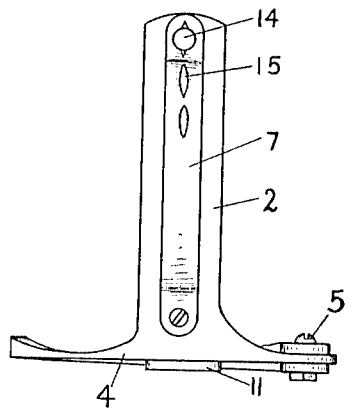
Figure 5:
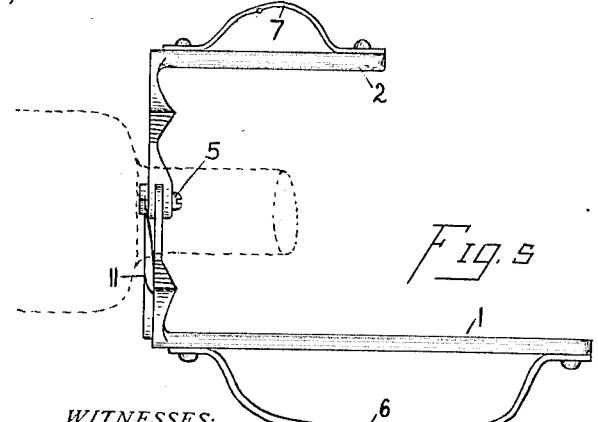

Figure 1 is a perspective view showing a husker in position in the hand of the operator; Fig. 2 shows the husker stripping down the husks on one side of the ear of corn; Fig. 3 is an end view showing in dotted lines the position of the husker when closed; Fig. 4 is a top view of one of the handles; and Fig. 5 is a side view of the husker, showing in dotted lines the method of severing the butt from the ear.

As is clearly shown in the drawings, the device consists of two handles 1 and 2 arranged parallel with each other, to be received in the hand, as shown in Fig. 1. Curved jaws 3 and 4 are carried by the handles respectively, the jaws being pivoted together as at 5, so they can be opened and closed by opening and closing the hand. The fingers of the operator are inserted beneath the strap 6 secured to the handle 1 and the thumb beneath the strap 7 secured to the handle 2. The extremities of the jaws 3 and 4 are preferably serrated as at 9 and 10 in Fig. 3 to avoid tearing through and losing the grip on the husk, and one of the jaws as 3, is provided with an inwardly projecting knife blade 11 adapted to shear past the jaw 4 when the jaws are closed.

The operation of the device is as follows: Holding the ear of corn in one hand, the husks on one side of the ear near the top are seized between the jaws 9 and 10 and stripped down to the butt. The jaws are then opened, the butt close to the ear is seized between the blade 11 and the jaw 4, as indicated in Fig. 5, the handles are brought together, causing the blade 11 to nearly sever the butt, and with a slight bending movement the butt is detached from the ear, and with a continuation of the same movement the remaining husks which have adhered to the butt, are stripped off.

It will thus be seen that in practice only three movements are required, first stripping the husk from one side of the ear, severing the butt, and stripping the remainder of the husk from the ear.

It will be noticed that the arrangement of the handles 1 and 2 is such as to admit the butt between them when the jaws 3 and 4 are closed and that the hand of the operator is close up to the jaws 3 and 4 and the knife 11, thereby enabling the operator to exert pressure right at the point where the butt is severed. Furthermore it will be noted that the two handles at all times lie flat in the hand, enabling the operator to exert the full strength of his hand if necessary, without cramping or straining the muscles.

The knife 11 is preferably flat on the outer side and slightly beveled on the inner side, as shown in Fig. 5, and the edge of the knife may be ground away to form a curved cutting edge 12 terminating in a rounded point 13. The purpose of beveling the knife on the inner side is to cause it to draw up close to the end of the ear of corn when severing the butt, and I have found in practice that the shape of the curved cutting edges 12 and 13 enables the knife to more easily sever the butt.

The straps 6 and 7 may be secured to the handle in any desired manner, but I prefer to secure them by adjustable fastenings such as a button 14 secured to the handle, and to provide the straps with openings 15 to receive the button, thereby enabling the straps to be adjusted to suit the size of the operator's hand. In practice I prefer to make the handle 1 and jaw 3 in one piece, and the handle 2 and jaw 4 in one piece, preferably casting each piece from aluminum or other suitable light and strong material.

Having described my invention, what I claim and desire to secure by Letters Patent, is:—

In a corn husker comprising a pair of pivotally connected curved jaws, a handle carried by each jaw and projecting at right angles to the plane of opening of said jaws and straps secured to the handles, the ends of said jaws being curved and formed with opposing serrations adapted to grip the husk when the jaws are closed.

In testimony whereof, I affix my signature in presence of two witnesses.

HERMAN BESSER.

Witnesses:
WILL A. PRINCE,
J. R. McHARG.

Copies of this patent may be obtained for five cents each, by addressing the "Commissioner of Patents, Washington, D. C."